(12) United States Patent
Jain (10) Patent No.: US 9,809,468 B1
(45) Date of Patent: Nov. 7, 2017

(54) WATER DISINFECTION SYSTEM USING FUNCTIONAL MIXTURE, COPPER FOAM CATALYST, CONTINUOUS FLOW, UV RADIATION, OPTICAL PIPE

(71) Applicant: Ashli Iyer Jain, Los Altos Hills, CA (US)

(72) Inventor: Ashli Iyer Jain, Los Altos Hills, CA (US)

( * ) Notice: Subject to any disclaimer, the term of this patent is extended or adjusted under 35 U.S.C. 154(b) by 0 days.

(21) Appl. No.: 15/681,297

(22) Filed: Aug. 18, 2017

(51) Int. Cl.
    *C02F 1/32*         (2006.01)
    *C02F 1/72*         (2006.01)
    (Continued)

(52) U.S. Cl.
    CPC .............. *C02F 1/325* (2013.01); *B01J 23/72* (2013.01); *B01J 35/004* (2013.01); *B01J 35/04* (2013.01);
    (Continued)

(58) Field of Classification Search
    CPC ......... Y02E 60/50; B01J 23/889; B01J 23/89; H01M 4/06; H01M 4/90; C02F 1/32; C02F 1/78; C02F 1/72; C02F 101/38
    See application file for complete search history.

(56) References Cited

U.S. PATENT DOCUMENTS 3,078,552 A     2/1963   Grandley
4,232,171 A *  11/1980  Yoneoka ................. C07C 67/40
                                                     502/244

(Continued)

FOREIGN PATENT DOCUMENTS

CN     101396661 A  *  4/2009
CN     106311277 A  *  1/2017
    (Continued)

OTHER PUBLICATIONS

Name not available, CN-106311277-A translation, Preparation of supported copper catalyst used for supercritical water oxidation removal of acrylonitrile by washing copper foam particles, soaking in acetone, filtering, washing, soaking in hydrochloric acid solution, and filtering Jan. 2017, Entire document.*

(Continued)

*Primary Examiner* — Walter D. Griffin
*Assistant Examiner* — Cameron J Allen
(74) *Attorney, Agent, or Firm* — Stephen E. Zweig (57) ABSTRACT

The present invention is a method of implementing Water Disinfection System employing a Functional Mixture, copper foam catalyst, continuous flow, UV radiation, and optical receiver pipe in order to inactivate broader range of microbial contaminants in drinking water, both for emergency purification kits and larger filtration systems. The Functional Mixture is formed when the portland cement ($CaO-SiO_2-Al_2O_3$) and silicon dioxide ($SiO_2$) combination is applied to the amalgamation of porous copper foam (Cu-Foam) and silver nitrate ($AgNO_3$) particles, which react through the silver tree reaction ($Cu+2AgNO_3 \rightarrow 2Ag+Cu(NO_3)_2$) after spraying over a perforated mask. The high porosity Functional Mixture is placed in UV transmissive receiver pipe with optical properties. These configurations improve the coverage, efficiency, and effectiveness of reducing broader range of pathogenic microbes in water disinfection systems over prior art. Further optimizations are available for broader range of solar lighting conditions and water flow rates.

12 Claims, 8 Drawing Sheets

(51) Int. Cl.
*B01J 35/00* (2006.01)
*B01J 35/04* (2006.01)
*B01J 35/10* (2006.01)
*B01J 37/00* (2006.01)
*B01J 37/06* (2006.01)
*B01J 23/72* (2006.01)

(52) U.S. Cl.
CPC ........... *B01J 35/10* (2013.01); *B01J 37/0072* (2013.01); *B01J 37/06* (2013.01); *C02F 1/725* (2013.01); *B01J 2523/18* (2013.01); *C02F 2201/009* (2013.01); *C02F 2201/3228* (2013.01); *C02F 2303/04* (2013.01); *C02F 2305/10* (2013.01)

(56) References Cited

U.S. PATENT DOCUMENTS

| | | | |
|---|---|---|---|
| 5,230,792 | A | 7/1993 | Sauska et al. |
| 5,401,538 | A | 3/1995 | Perito |
| 6,046,255 | A | 4/2000 | Gray |
| 7,862,728 | B2 | 1/2011 | Yencho |
| 8,038,938 | B2 | 10/2011 | Cabello et al. |
| 9,546,100 | B2 | 1/2017 | Blatchley, III et al. |
| 2014/0183141 | A1 | 7/2014 | Kurup |
| 2017/0106350 | A1 | 4/2017 | Bernardoni |

FOREIGN PATENT DOCUMENTS

| | | | | |
|---|---|---|---|---|
| CN | 106391012 A | * | 2/2017 | |
| WO | WO-2015063581 A1 | * | 5/2015 | ............... C02F 1/32 |

OTHER PUBLICATIONS

Zhiming Yu, CN-101396661-A translation, High-porosity foamed manganese catalyst material for ultraviolet spectrophotometry ozone analyzer, comprises structures having copper film plated as base material, and manganese oxide film loaded on foamed copper wire mesh Apr. 2009, Entire Document.*

Name not available, CN-106391012-A translation, Preparation of supported aluminum catalyst used for supercritical water oxidation removal of acrylonitrile involves washing aluminum foam particles with silver nitrate, subjecting to series of modifications, drying, and calcining Feb. 2017, Entire Document.*

Ashbolt, Nicholas, "Microbial Contamination of Drinking Water and Human Health from Community Water Systems", Curr Envir Health Rpt (2015) 2:95-106.

Chang et. al. "UV Inactivation of Pathogenic and Indicator Microorganisms", Applied and Environmental Microbiology, Jun. 1985, vol. 49 (6) p. 1361-1365.

* cited by examiner

WATER DISINFECTION SYSTEM USING FUNCTIONAL MIXTURE, COPPER FOAM CATALYST, CONTINUOUS FLOW, UV RADIATION, OPTICAL PIPE

BACKGROUND OF THE INVENTION

Field of the Invention

This invention is in the field of water disinfection technology employing functional mixture, copper foam catalyst, continuous flow, UV radiation, and optical pipe in order to inactivate a broader range of microbial contaminants in drinking water, both for emergency purification kits and larger filtration systems.

Description of the Related Art

Although often taken for granted in the US, the ability to obtain drinking water free from microbial contaminants, such as coliform bacteria, and other types of pathogens (see Ashbolt, Curr Envir Health Rpt (2015) 2:95-106) is an essential human need. As a result, there has been an extensive amount of prior art on ways to inactivate such microbial contaminants. In addition to larger scale standard civil engineering approaches, use of chlorine based germicides or disinfectants, and the like, a large number of smaller scale approaches, such as use of water purification germicidal tablets, solar stills, filters, and the like have also been developed. Here, however, unless the decontamination process works on a continuous flow basis, it is often difficult to obtain large enough quantities of potable drinking water. Thus continuous flow methods are often preferable.

Ultraviolet (UV) radiation is well known to inactivate microbes (see, for example, Yencho U.S. Pat. No. 7,862,728, Sauska U.S. Pat. No. 5,230,792). Artificial UV light sources are often used for this purpose because they can be tuned to produce high amounts of the more germicidal short wave UVC (100-280 nm) UV radiation. The solar ultraviolet radiation alters the DNA in specific microbiological organisms and deactivates it. The UV energy is typically by a double bond between the DNA thymine and cytosine residues, and this in turn breaks the molecular bonds of the DNA, often producing thymine dimers. These UV solar ultraviolet radiation produced thymine dimers in turn inhibits the microbe's reproductive process. Thus even though the inactivated microbe organisms remain in the water after such UV inactivation, the microbes, are unable to harm or cause infection in humans.

Although essentially all of the most germicidal UVC light is absorbed by the earth's atmosphere, appreciable amounts of medium wave (280-315 nm) UVB and longer wave (315-400 nm) UVA sunlight do penetrate the atmosphere, and these wavelengths are also germicidal, although to a lesser extent than UVA.

As a result, the use of solar disinfection (SODIS) methods to reduce the levels of pathogenic microbes for disinfecting drinking water is a commonly known and accepted methodology.

Previous work on continuous flow type solar UV radiation water disinfection systems includes the work of Blatchley et. al., U.S. Pat. No. 9,548,100. Blatchley teaches that a UV disinfection system can be produced by running drinking water through a UV transmissive plastic tube that is positioned at the focal point of a solar UV collector, such as a compound parabolic concentrator device. Although this device does indeed have anti-microbial activity, however, it apparently requires high amounts of sunlight and precisely optimized solar collectors, and is not effective against all types of pathogenic microbes. This can potentially limit the use of such systems, particularly in emergency situations, where the operators may have a limited ability to precisely configure optics and may wish to operate a continuous flow system under sub-optimal sunlight conditions.

Other workers, such as Kurup, US patent application 2014/0183141 have found that photocatalytic compositions, such as cement binder and glass bubble based photocatalysts containing TiO2, ZnO, and silver can be used to form effective water purification photocatalysts, however the methods that they taught generally required exposing their catalysts to sunlight for prolonged periods of time especially with lower porosity, thus rendering these methods potentially suboptimal for continuous flow applications. Other cement based photocatalytic compositions include the art of Bernardoni, US patent application 2017/0106350. Other photocatalytic methods also include the methods of Cabello, U.S. Pat. No. 8,038,938.

BRIEF SUMMARY OF THE INVENTION

This invention is in the field of water purification and disinfection technology employing a photocatalyst/functional mixture, copper foam catalyst, continuous flow, UV radiation, and optical pipe in order to inactivate broader range of microbial contaminants in drinking water, both for emergency purification kits and larger filtration systems.

Although for the highest volume applications, prior art methods of civil engineering and chlorine disinfection are entirely adequate, these methods are expensive and slow to build. There is a need for rapidly deployed methods that can be used to decontaminate intermediate amounts of water both on an emergency basis and for near-term use without storage and maintenance infrastructure.

In particular, there is a need for lightweight kits that can be stored on a long-term basis with minimal storage precautions (e.g. without having to worry about toxic chemicals), and then can be rapidly deployed to meet demands for intermediate amounts of water on an emergency basis. Such methods should ideally be very simple to operate.

The invention is based, in part on the insight that the water purification methods of Blatchley et. al. might be improved by using a novel and highly porous photocatalyst to allow for greater microbial inactivation efficiency over a broader range of ambient solar light, while still allowing for a water flow rate that would be adequate for a continuous flow purification system.

The invention was also based, in part, on the insight that a drawback of prior art photocatalytic based disinfection methods, such as cement based photocatalytic methods, was that the prior art based photocatalysts were insufficiently porous, and the prior art arrangements may not have provided adequate surface area through which the microbe containing water can flow past, and contact the photocatalyst in the presence of UV light.

In some embodiments, the invention may comprise a method, such as a continuous flow method, for purifying water. In this method, a novel functional mixture with an internal copper foam structure containing a meshwork of many millimeter or sub-millimeter sized cement aggregate/silver particles is used. This novel functional mixture is here termed a "copper foam catalyst" or sometimes just "catalyst" or "photocatalyst".

The Functional Mixture is formed when the portland cement ($CaO$—$SiO_2$—$Al_2O_3$) and silicon dioxide ($SiO_2$)

combination is applied, often by spray deposition, to a composition of porous copper foam (Cu-Foam) and silver nitrate ($AgNO_3$) particles, created by the silver tree reaction ($Cu+2AgNO_3 \rightarrow 2Ag+Cu(NO_3)_2$).

The invention's copper foam catalyst is configured to have a high surface area, and many water conducting pores or channels. The high porosity functional mixture/photocatalyst is placed in a UV transmissive receiver pipe with optical properties. This copper foam catalyst will often be disposed in the form of one or more thin sheets that can be configured as to both expose a substantial amount of the surface area of copper foam catalyst to UV light, while at the same time forcing the drinking water to traverse the various pores and channels of the catalyst. During this process, the microbial contaminants of the drinking water will be forced in close proximity to catalytic particles (typically concrete/sand mixtures with embedded silver particles) that are also being exposed to UV light. The action of the UV light upon these catalytic particles produces disinfecting chemicals (e.g. Hydroxyl radicals, hydrogen peroxide) that destroy the microbial contaminants at a higher efficiency than just UV light alone. In a preferred embodiment, the copper foam catalyst is formed from many small particles that are aggregates of Portland cement, sand, and silver particles, all held into position by the cellular structure of the copper foam.

In some embodiments, the invention may also be a method of implementing a continuous flow water purification system employing a solar UV activated catalyst formed from porous copper, Portland cement, sand, and silver particles. This catalyst is placed in a UV transmissive tube that traverses a generally linear, trough or concave shaped solar UV reflector. The solar UV activated catalyst is configured to be highly porous and to optimize the surface area over which microbe containing drinking water comes into contact with catalyst and UV light. This improves the coverage, speed, and effectiveness of reducing pathogenic microbes in drinking water disinfection systems over prior art. The catalyst's underlying copper foam structure, the shape of the tube, and the shape of the solar UV reflector can all be optimized for best performance, and to provide a broader range of antimicrobial activity over a broader range of solar lighting conditions and water flow rates.

DETAILED DESCRIPTION OF THE INVENTION

Nomenclature: The invention's water conducting tube may occasionally be alternatively referred to as a receiver pipe or "pipe". The invention's copper foam based catalyst may occasionally alternatively be referred to as a coating or functional coating.

Figure 1:
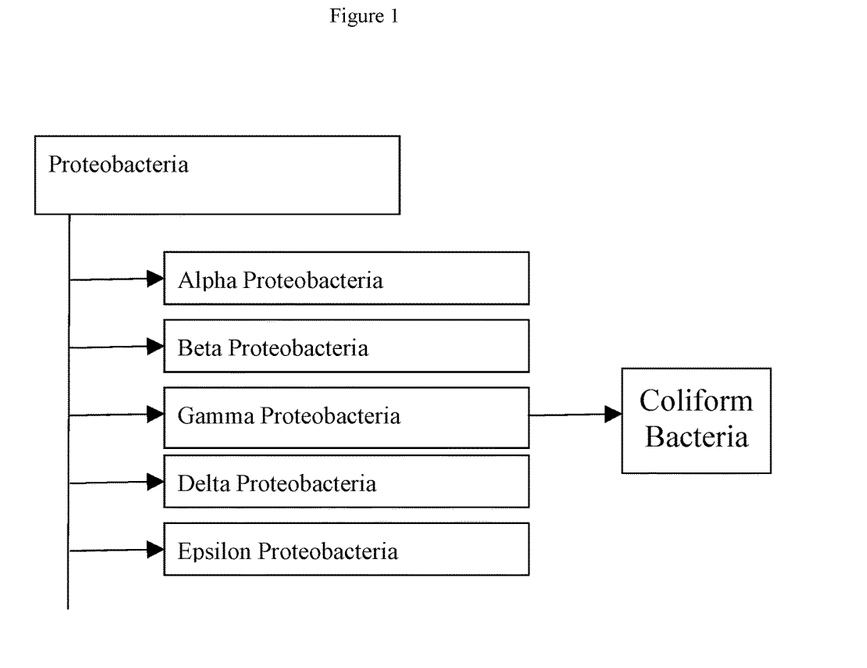
FIG. 1: Example of various types of microbes, including pathogenic and non-pathogenic bacteria.

As discussed by Ashbolt, "*Microbial Contamination of Drinking Water and Human Health from Community Water Systems*", *Curr. Envir. Health Rpt.* (2015) 2:95-106, drinking water can potentially contain many different types of microbial pathogens, including viral pathogens, bacterial pathogens, protozoan pathogens, and fungal pathogens. FIG. 1 shows a subset of some of these microbes/microbial pathogens, including various pathogenic and non-pathogenic bacteria.

Although UV inactivation is known to inactivate microbial pathogens, as taught by Chang et. al., "UV inactivation of pathogenic and indicator microorganisms." Appl. Environ. Microbiol. June 1985 vol. 49 no. 6 1361-1365, there is a wide variation in the UV sensitivity of various microbial pathogens. As a result, the prior art methods of Blatchley, U.S. Pat. No. 9,546,100 can be somewhat problematic because these methods rely only on solar UV radiation, which at normal altitudes is depleted in the most germicidal shorter UV wavelengths (UVC), and contains mostly the less germicidal UVB and UVA ultraviolet radiation. Here the term "solar UV radiation" or "solar UV light" will be used to denote UV radiation that comprises UVA and UVB radiation, but not UVC radiation.

Figure 2:
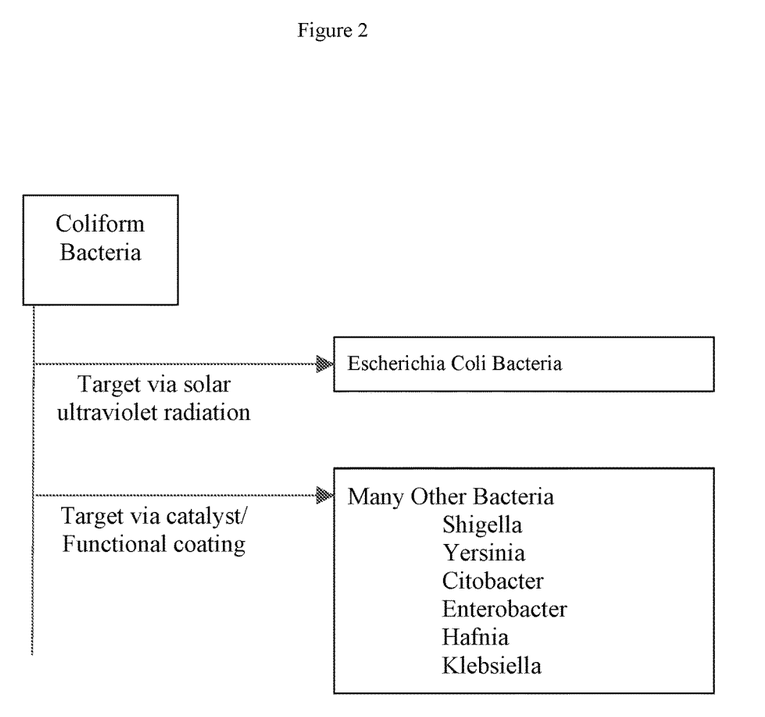
FIG. 2: Example of differing sensitivity to direct UV light inactivation and UV light catalyst chemical mediated inactivation among various subgroups of potentially pathogenic coliform bacteria.

Thus the invention was inspired, in part, by the insight that although the methods of Blatchley have some merit, chemical inactivation of microbial pathogens may produce a more robust and reliable decontamination system. This is shown in FIG. 2, which gives an example of differing sensitivity to direct UV light inactivation and UV light catalyst chemical mediated inactivation among various subgroups of potentially pathogenic coliform bacteria.

Thus in some embodiments, the invention may be a system or method for using solar UV radiation to purify water on a continuous flow basis through the use of solar UV light concentrators and a novel copper foam based UV light activated catalyst. This UV light activated catalyst, upon exposure to solar UV light, produces disinfecting chemicals that can be more effective at inactivating a broader range of pathogenic microbes.

In some embodiments, the system or method is based on the invention's unique catalyst which comprises a water permeable copper foam support embedded with a plurality of silver particle laced Portland cement/sand cement aggregates. The copper foam support is typically formed from a base material comprising nearly pure (e.g. 99%+ pure) copper. This copper foam will typically have sponge like structure comprising a plurality of thin copper walls partially surrounding open pores (or void spaces) with average pore dimensions (diameters) of between about 0.5 to 5 millimeters. This copper foam support is relatively light weight and porous, with 90% or greater of its volume consisting of these pores or void spaces.

Although there appears to be little, if any, prior art on the use of copper foams for water purification systems, copper foam is commonly used for battery terminals and heat transfer applications. It is commercially available from multiple sources. These commercial sources provide copper foam with multiple pore structures, and multiple dimensions ranging from thin sheets to more brick like forms. These copper foams may be formed according to the methods of Grandley, U.S. Pat. No. 3,078,552, the entire contents of which are incorporated herein by reference, or by other methods.

In a preferred embodiment, the pores or void spaces of the copper foam are predominantly (e.g. more than 50%) open pores so as to enable flow of water throughout the copper foam. In this preferred embodiment, the copper foam is selected to have a "water permeable" structure that allows water to flow from a first side of the copper foam, through the various internal voids and pores, to an opposite side of the copper foam.

Figure 3A:
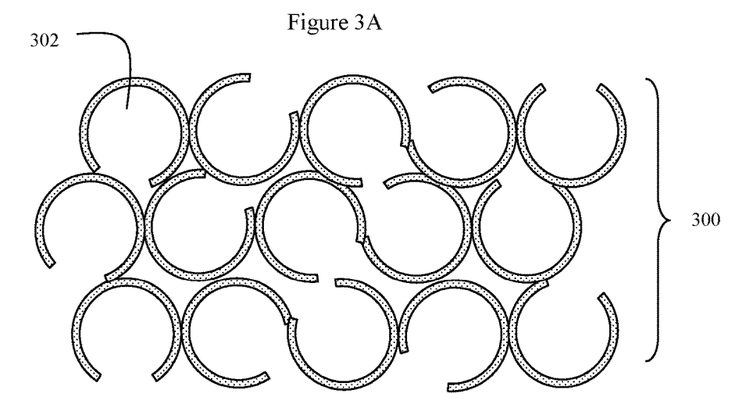
FIG. 3A shows a drawing showing the various pores of an open-celled copper foam.

FIG. 3A shows a drawing showing the various pores (302) of an open-celled copper foam (300).

The invention's unique catalyst is formed by embedding a large number of small silver particles, such as very fine silver threads, throughout much of the extent of the copper foam support, where they are later incorporated into the Portland cement aggregate particles. This can be done by treating the copper foam support with an aqueous mixture of silver nitrate for a sufficient time as to allow formation of precipitated silver particles in at least some of the pores, thus producing pores comprising silver particles, according to the "silver tree" reaction.

Usually this aqueous mixture of silver nitrate will comprise between a 0.01 molar to 0.05 molar solution of $AgNO_3$ (silver nitrate), and the "sufficient time" will typically be a time of 1 hour or more. Generally the reaction conditions should be such as to allow the length of the fine silver strands to, on average, obtain a length approximately equal or greater than a third of the diameter of the average pore dimensions of the copper foam.

Figure 3B:
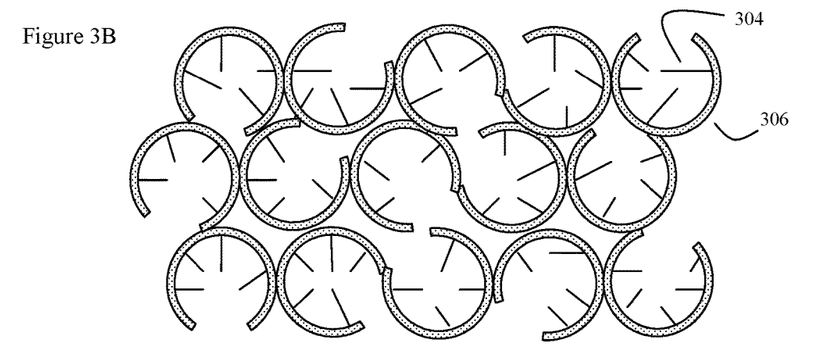
FIG. 3B shows the copper foam after treatment with a silver nitrate ($AgNO_3$) solution, resulting in precipitation of fine silver strands (particles) on or near the copper pore walls of the copper foam.

FIG. 3B shows a drawing of the internal structure of the copper foam after treatment with a silver nitrate ($AgNO_3$) solution, resulting in precipitation of fine silver strands (particles) (304) on or near the copper pore walls (306) of the copper foam. Although this reaction may proceed at approximately room temperature (e.g. 20-30° C.) for one or more hours, to accelerate the speed of the reaction, higher temperatures may be used.

Figure 3C:
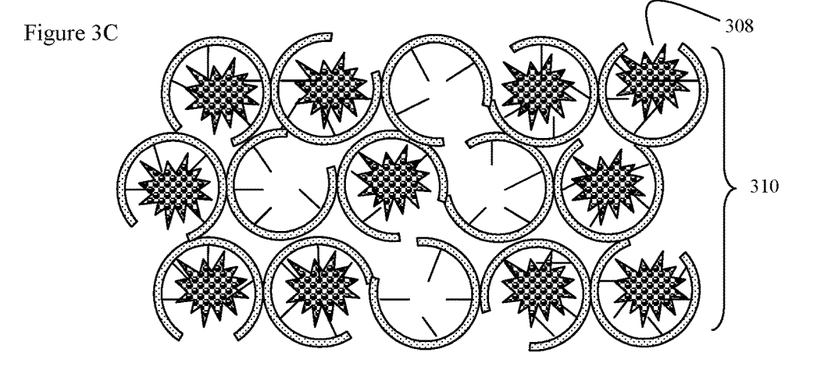
FIG. 3C shows the copper foam after exposure to a Portland cement and sand slurry. This slurry penetrates at least some of the pores of the copper foam and then expands and hardens, forming the catalytic structure with embedded silver particles.

To create the silver particle containing aggregates of Portland cement/sand (308), which themselves are embedded in the pores of the copper foam, after formation of the silver particles, and usually while still wet, at least one surface of the copper foam support is then sprayed with slurry droplets. These slurry droplets will comprise an aqueous slurry of Portland cement and sand particles, and the spraying will be done so as to fill at least some of copper foam pores with the Portland cement and sand particle slurry. This will thus produce a water permeable copper foam catalyst (310) comprising pores filled with Portland cement, sand particles, and silver particles.

In some embodiments, it is also possible to place silver particles directly into the Portland cement and sand slurry mixture prior to spraying onto the surface of the copper foam. Although this embodiment is not disclaimed, it is not preferred. It is generally preferable, from a catalytic activity standpoint, to have the silver particles generally positioned so as to form a bridge between the conductive copper foam walls and the surface of the Portland cement and sand aggregates. This is why the silver particles/thin strands are typically formed on and near the surface of the copper foam walls before the Portland cement/sand slurry droplets are applied to the copper foam.

FIG. 3C shows the copper foam after exposure to a Portland cement and sand slurry. This slurry penetrates at least some of the pores of the copper foam and then expands and hardens, forming the catalytic structure with embedded silver particles (310).

The solids portion of the Portland Cement/sand slurry may comprise:
Portland Cement: 30%<=x<=40%
Sand: 50%<=x<=60%
0-20% other (e.g. any of shredded expanded polystyrene, cellulose, or methyl cellulose, used to modify the properties of the slurry to make it more sprayable).

The Portland cement/sand mixture can be a mixture of between 0:5:1 to 1.6:1 (water:solids mixture) as per the teaching of Perito, U.S. Pat. No. 5,401,538, the entire contents of which are incorporated herein by reference.

The grain size of the Portland cement and the sand will typically be chosen to be significantly smaller than (e.g. less than 25% of) the average pore diameter of the copper foam support. Thus, for example, in an open pore copper foam support with an average pore diameter of 4 mm, the maximum grain size of the Portland cement and sand grains should be less than 1 mm. This is because grains much larger than this will have difficulty becoming embedded into the copper pores. In a preferred embodiment, the sand itself will be a UV transmissive material, such as silica sand, in order to enable UV light to penetrate further into the structure. Here materials such as silica sand, preferably chosen to optimize UV transmission, may be used.

FIGS. 3A, 3B, and 3C show an example of how the copper foam support (300) can be converted into a copper foam catalyst (310). The copper foam support is treated with an $AgNO_3$ solution (e.g. 0.02M $AgNO_3$) resulting in precipitation of fine silver strands (304) on the copper pore walls (306) of the copper foam (300). The copper foam support is also exposed to droplets of the Portland cement sand slurry, which penetrates the pores of the copper foam and then expands and hardens (308). During this process, the Portland cement particles react with the water, expand, and bind at least some of the fine silver strands (304). As a result, at least some of the various copper foam pores become filled with a mixture of the fine silver strands and the Portland cement and sand slurry, thus creating a water permeable copper foam catalyst (310), with a substantial amount of open structure, and with the silver particles (304) predominantly distributed near the outside the Portland cement and sand aggregate (308), where the silver particles are better positioned to promote catalytic activity.

Figure 4:
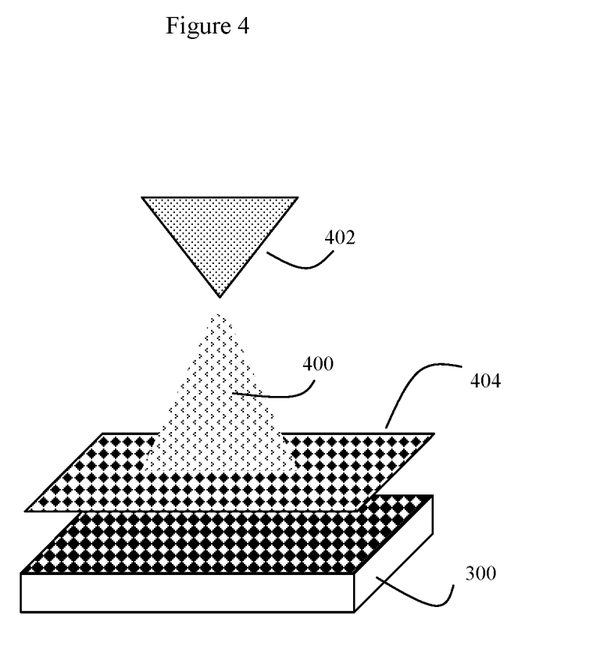
FIG. 4 shows how the Portland cement and sand slurry may be applied to at least one surface of a copper foam sheet using a spraying process, along with an optional perforated mask to ensure adequate amount of untreated copper foam exists to help preserve the porosity of the final catalytic material.

FIG. 4 shows how the Portland cement and sand slurry (400) may be applied to at least one surface of a copper foam sheet (300) using a spraying process (402), along with an optional perforated mask (404) to ensure that adequate amount of untreated copper foam exists to help preserve the porosity of the final catalytic material. As previously discussed, various spraying methods may be used; including the methods of Perito, U.S. Pat. No. 5,401,538, and Gray, U.S. Pat. No. 6,046,255, the entire contents of both U.S. Pat. Nos. 5,401,538 and 6,046,255 are incorporated herein by reference.

After the droplets of Portland cement and sand (400) have been applied to the surface of the copper foam (300), and after these droplets have had sufficient time to react and harden (typically between 1-12 hours) the resulting copper foam catalyst (e.g. the resulting copper foam, silver particles, and Portland cement and sand aggregate particles embedded in the pores of the copper foam 310) can be cleaned. This is usually done by flushing the copper foam catalyst with an excess of water to remove any unbound Portland cement, sand particles, silver particles, and any other residual unbound material. The cleaned copper foam catalyst may then be dried and stored until it is needed in the next step of the process.

Figure 5:
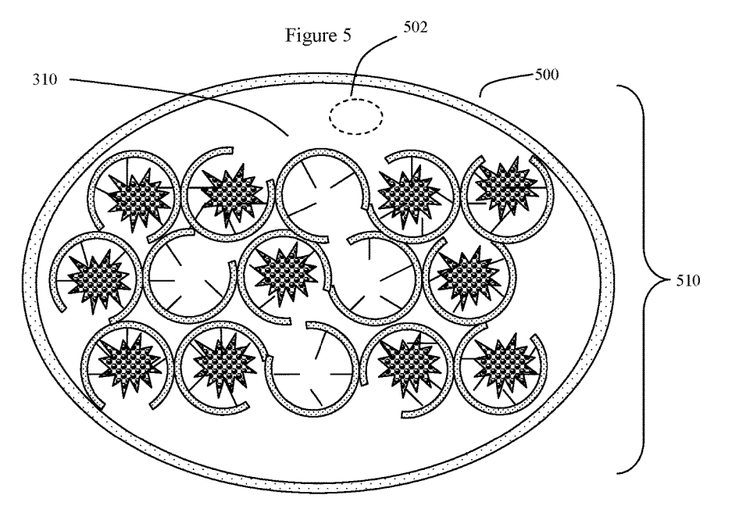
FIG. 5 shows one embodiment by which the copper foam catalyst may be disposed inside of the UV transmissive, plastic tube, thus forming a catalytic tube assembly.

Once the copper foam catalyst (310) has been produced, it is typically then disposed or placed on the inside of one or more sections of a hollow, UV transmissive, hollow plastic tube (See FIG. 5, 500). This plastic tube (or at least the cumulative length of all of the sections) will typically have a length of at least one meter, and an inner diameter of at least 1 centimeter. The hollow plastic tube, or combination of joined sections of a plurality of hollow plastic tubes, will typically have an entrance opening, and an exit opening (see FIG. 9B 940 and 942). The copper foam catalyst (310) will typically be positioned inside of the hollow plastic tube or tubes (510) so that, with the exception of any joint regions (930), the copper foam catalyst will extend from the entrance opening of the plastic tube (940) to the exit opening of the plastic tube (942). This combination of the copper foam catalyst and the plastic tube is here termed a "catalytic tube assembly." (See FIGS. 5 and 8).

The UV transmissive plastic tube will preferably comprise a UV light transmissive but UV degradation resistant plastic. Here fluorocarbon based fluoropolymer tubes, such as FEP (Fluorinated Ethylene Propylene), PFA (Perfluoroalkoxy) and the like may be used. In a preferred embodiment, the tube will pass more than 50% of the incident solar UV illumination from the outside to the inside of the tube.

The copper foam catalyst (310) may be arranged inside the hollow tube (510) in a variety of different configurations. However some general principles should be kept in mind. In order to maximize microbial pathogen killing efficiency, all portions of the water passing through the tube should ideally pass through a UV light illuminated portion of the copper foam catalyst at least once, and preferably as many times as possible. That is, each traversal of a section of UV illuminated copper foam catalyst should be assumed to result in the inactivation of some, but not all, of the water borne microbial pathogens.

One big advantage of using the copper foam support is that it can maintain its own macroscopic (e.g. overall) structure. Thus it may be fabricated in various configurations designed to maximize microbial pathogen killing efficiency.

FIG. 5 shows one embodiment by which the copper foam catalyst may be disposed inside of the UV transmissive, plastic tube, thus forming a catalytic tube assembly (510). Although this diagram, which is not to scale, allows the overall structure of the foam and the walls of the plastic tube to be visualized, note that it is not a preferred embodiment. That is, water passing on top (502) of the copper foam catalyst (310) is not forced into contact with the copper foam catalyst, thus providing an avenue through which at least some microbial pathogens may escape inactivation. Thus this arrangement, although simple to understand, is suboptimal.

In a preferred embodiment, the copper foam catalyst should be configured so that water flowing through the tube is not blocked from flowing from the entrance opening of the plastic tube to the exit opening of the plastic tube. However the copper foam catalyst should also be configured so that the water must contact the copper foam catalyst at least once (and preferably multiple times) while progressing from the entrance opening to the exit opening.

Due to electron transport effects through the electrically conductive copper foam walls, as well as diffusion of any cytotoxic chemicals, those regions of the copper foam catalyst that are not directly exposed to UV solar illumination may also be effective at killing microbial pathogens. However in a preferred embodiment, at least some of these points of contact between the water and the copper foam catalyst should be in regions of the copper foam catalyst that also receive solar UV illumination.

To achieve these goals, in a preferred embodiment of the invention, the catalytic tube assembly will be placed in at least one focal point of a solar UV reflector. Here the solar UV reflectors taught by Blatchley, U.S. Pat. No. 9,546,100 the entire contents of which are incorporated herein by reference, are generally adequate. However alternative designs may also be used.

UV reflectors generally concentrate all forms of solar illumination, UV light, visible light, and infrared light, to approximately the same focal region. In a preferred embodiment, the solar UV reflectors used for the present invention should be configured to concentrate the solar UV enough to optimize the microbial killing capability of the copper foam catalyst inside the tube, but not concentrate the infrared radiation (e.g. solar heat) enough to otherwise damage the plastic tube.

In a preferred embodiment, the solar UV reflector is configured to concentrate the UV components of sunlight so that substantially an entire length of the catalytic tube assembly is exposed to solar UV light when the solar UV reflector receives solar UV illumination.

Figure 6:
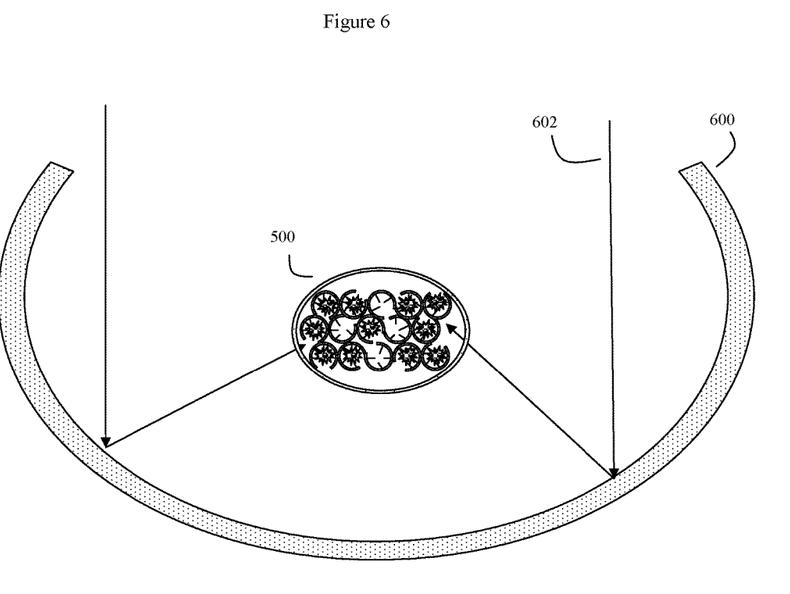
FIG. 6 shows a 2D sketch of the catalytic tube assembly disposed at a focal point of a solar UV reflector.

FIG. 6 shows rough 2D sketch of the invention's catalytic tube assembly disposed at a focal point of a concave solar UV reflector (600) (here shown somewhat squashed to better fit on the page). This configuration shows a cross section of the tube assembly and the concave solar UV reflector. The UV containing sunlight (602) is at least roughly focused onto the tube (500).

Figure 7:
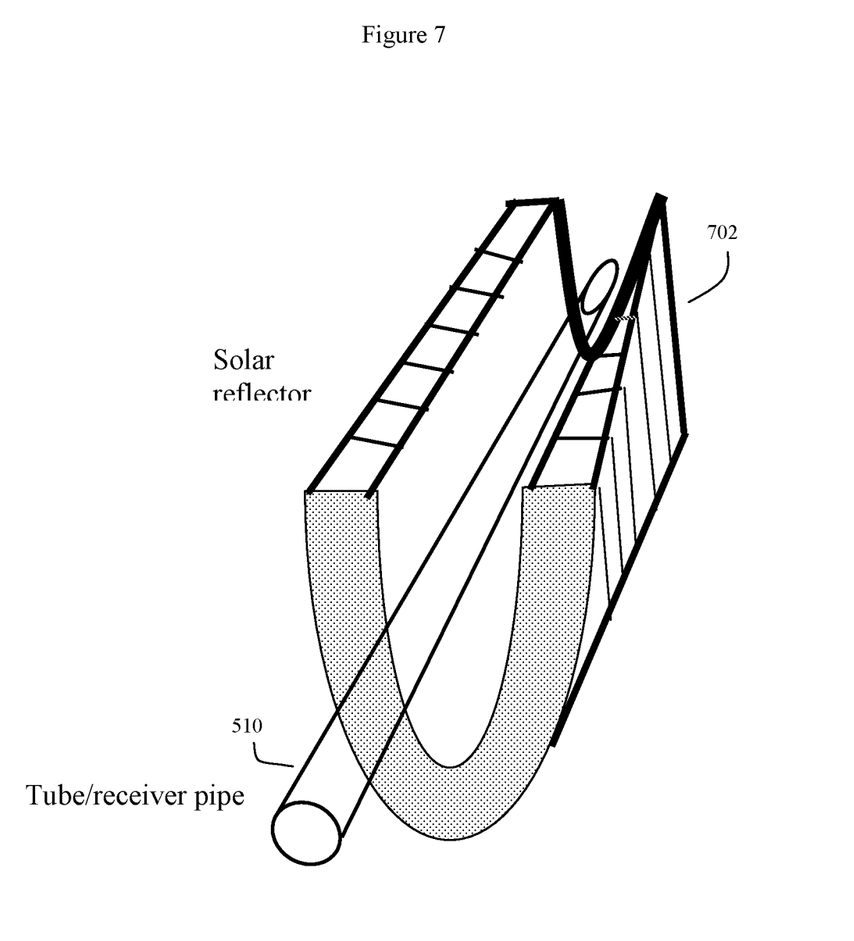
FIG. 7 shows a rough 3D sketch of the catalytic tube assembly disposed at a focal point of a solar UV collector.

FIG. 7 shows a rough 3D sketch of the catalytic tube assembly (510) disposed at a focal point of a trough like solar UV collector (702). Here the solar UV collector may have a parabolic trough-like design, and be a tracking collector, as taught by Blatchley in U.S. Pat. No. 9,546,100.

Figure 9A:
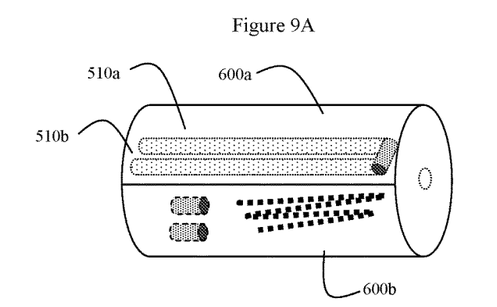
FIG. 9A shows how the catalytic tube assembly and the solar UV reflector may be configured in the form of a kit that can be stored and transported in a more compact form.
Figure 9B:
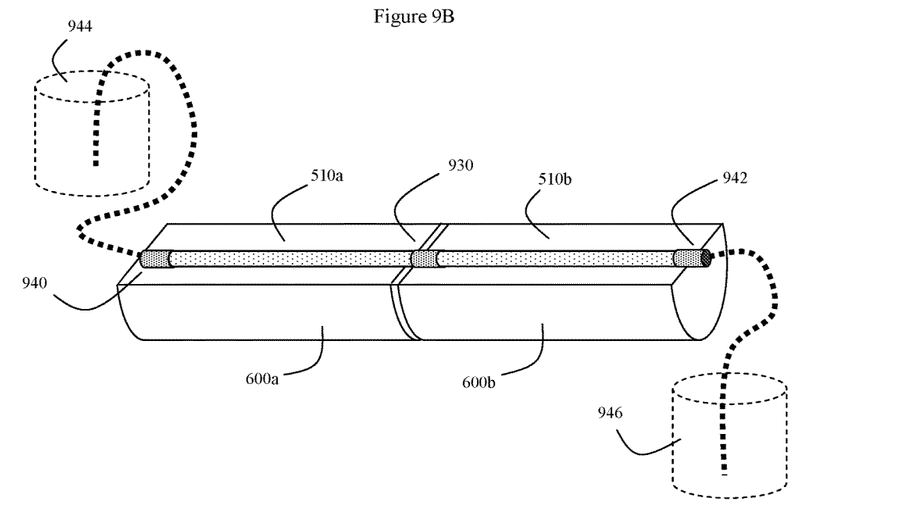
FIG. 9B shows how the catalytic tube assembly and the solar UV reflector from FIG. 9A may be then extended and deployed for use. Here the curved surfaces used for the UV reflector may also be used to form the walls of a container used to store the various components of the system.

In operation, as shown in FIG. 9B, the invention may be operated by connecting the entrance opening (940) to a drinking water source (944 e.g. a water source typically comprising drinking water suspected of having microbial contaminants). The exit opening (942) is typically connected to a drinking water collection device (946). After this connection, typically the drinking water suspected of having pathogenic microbial contaminants will be run through the catalytic tube assembly in a presence of the solar UV illumination. The flow rate will typically be set slow enough that action of the solar UV illumination on the copper foam catalyst is adequate to destroy substantially all of the pathogenic microbial contaminants. This exact rate will vary, of course, according to the dimensions and configurations of the catalytic tube assembly. The net result is the production of purified drinking water.

Further Embodiments

Producing the silver particles: In some embodiments, the process of treating the copper foam support with an aqueous mixture of silver nitrate may be done by placing both the aqueous mixture of silver nitrate, and the copper foam support into a common container, and allowing the mixture to react for at least one hour. Here, for example, the copper foam may be immersed in a shallow trough containing the silver nitrate solution. At least some of the subsequent processing steps, such as the spraying step described below, and optional water washes, may also take place in this trough as well. At least before the Portland cement and sand mixture is applied, the attachment between the silver particles and the sides of the copper foam will be tenuous, and thus the copper foam and silver particle structure produced during the intermediate step shown in FIG. 3B should be treated gently at this stage.

Adding the Portland cement and sand mixture: In some embodiments, the spraying process (402) of applying droplets (400) of an aqueous slurry of Portland cement and sand particles to at least one surface of the copper foam (300) can be done by covering between 20% to 80% of an outer (e.g. at least one) surface of the copper foam support with the aqueous slurry droplets. The remaining part of the surface of the copper foam support (e.g. the other 80% to 20% of the at least one treated outer surface of the copper foam support) will be kept free from these droplets. The droplets will then be allowed to further penetrate into the pores of the copper foam support, and allowed to harden for at least one hour.

In order to better control the spacing between the droplets and the droplet free regions on the surface of the copper foam support, in some embodiments, a masking process may be used. Here, for example, a perforated mask (FIG. 4, 404) (i.e. a thin and otherwise solid sheet with perforations corresponding to the regions where droplets are desired to pass, and solid portions where droplets are blocked) can be used. This mask (404) may be placed between the sprayer (402) and the surface of the copper foam support (300) during the spraying process, thus helping to ensure adequate spacing between the slurry droplets. In a preferred embodiment, the mask perforations will be configured to as to ensure that at least 20% of the outer surface of the copper foam support will be free from the slurry droplets.

Configuring the shape of the copper foam catalyst: Since the catalyst will generally operate at highest efficiency near the surface of the catalyst where the catalyst is also being exposed to incident UV light, generally the use of thin sheets of copper foam, arranged in a manner that optimizes illumination of the surface with solar UV light, is optimal. Thus in a preferred embodiment, the copper foam catalyst will often be configured in the form of a thin sheet with a thickness less than 5 millimeters, and preferably even less than 3 millimeters, or even less than 1.5 millimeters. In order to orient the copper foam catalyst in a manner that optimizes both passage of water through the catalyst, and exposure of the surface of the catalyst to incident solar UV light, use of certain "twisted" or helical" configurations may be desirable.

Figure 8:
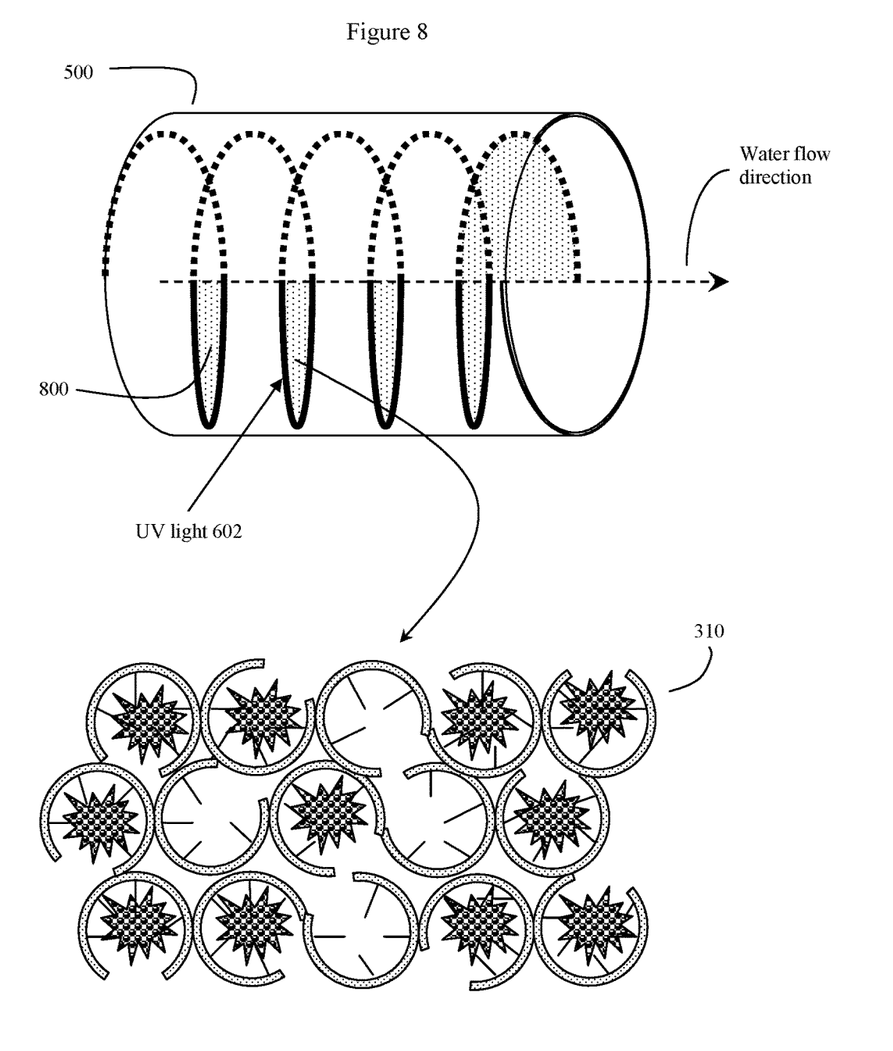
FIG. 8 shows how a thin sheet version of the copper foam catalyst can be disposed in a twisted configuration (e.g. a helical twist inside) of the plastic tube, thus allowing much of the surface of the copper foam catalyst to receive UV light, while at the same time forcing the drinking water to flow through the water permeable open pore structure of the catalyst.

FIG. 8 shows how a thin sheet version of the copper foam catalyst (310) can be disposed in a twisted configuration (e.g. a helical twist 800) inside of the plastic tube (500), thus allowing much of the surface of the copper foam catalyst to receive UV light (602), while at the same time forcing the drinking water to flow through the water permeable open pore structure of the catalyst.

More specifically, FIG. 8 shows that in some embodiments, the copper foam catalyst (310) may be further disposed in a helical or other twisted sheet configuration (800) over a length (preferably at least 80% or more of the length) of the one or more plastic tubes (500). This helical or otherwise twisted sheet configuration (800) will preferably be disposed so that all or nearly all (e.g. more than 80%) of the surfaces of the helical twisted sheet configuration can receive the incident solar UV light (602 i.e. either directly from the sun, or reflected from the solar UV reflector(s) (600).

In some embodiments, the copper foam catalyst (310) may be in the form of a sheet with a thickness of less than 5 millimeters. Here, the copper foam catalyst may be attached to a portion comprising less than 180 degrees of an interior wall of the tube (500). As a result, more than half of the tube remains translucent to UV light. This configuration again allows solar UV light to penetrate into the tube and contact a portion of the copper foam catalyst. The drinking water, as it runs through the tube, can then contact this UV illuminated copper foam catalyst.

Solar UV reflector and transportable kit configurations: As previously discussed, the invention may be particularly useful in emergency situations. Thus it is useful to provide the invention in the form of a transportable kit that can be stored for long periods of time, and then transported to a location in need of clean drinking water. It is further useful to provide the invention in the form of a kit that can then be rapidly assembled and operated by unskilled users.

FIG. 9A shows how the catalytic tube assembly and the solar UV reflector may be configured in the form of a kit that can be stored and transported in a more compact form. Here this is termed a "compressed disinfection unit".

Thus in some embodiments, the catalytic tube assembly and the solar UV reflector can comprise materials capable of being reversibly configured between a compact storage version (with a minimum compressed dimension), and an extended deployment version (with a maximum extended dimension). In these embodiments, the catalytic tube assembly (510*a*, 510*b*) and the solar UV reflector (600*a*, 600*b*) can be configured to fit into to a minimum compressed dimension that is, for example, less than one half of the maximum extended dimension. Here this compressed configuration will be termed a "compressed disinfection unit".

FIG. 9B shows how the catalytic tube assembly (510*a*, 510*b*) and the solar UV reflector (600*a*, 600*b*) from FIG. 9A may be then extended and deployed for use. Here the curved surfaces (600*a*, 600*b*) used for the UV reflector may also be used to form the walls of a container in FIG. 9A used to store the various components of the system.

In this embodiment, the compressed disinfection unit (FIG. 9A) can be transported from a first geographic location (e.g. a storage location) to a second geographic location (e.g. location where it is needed). Once at the second location, the catalytic tube assembly (510a, 510b) and the solar UV reflector (600a, 600b) can then be extended to the maximum extended dimension, here called the "extended disinfection unit". This extended disinfection unit can then be used to produce drinking water.

More specifically, in some embodiments, in the compact storage version, the catalytic tube assembly and the solar UV reflector can comprise a kit wherein the solar UV reflector (600a, 600b) is folded to form an enclosure to encase the catalytic tube assembly (510a, 510b) (and other components as desired, such as extra tubes, joints, valves, compressible water storage containers, instructions for use) during transport.

Here, for example, to facilitate assembly and disassembly, the copper foam catalyst may further comprise joint regions (930) or breaks between tubes. During the reversible configuration between the compact storage version and the extended deployment version, the copper foam catalyst can compress, extend, or bend by way of these joint regions or breaks.

Optimizing Optical Efficiency:

To facilitate low cost production (e.g. inexpensive kits); often the solar UV reflector may not have an optimal optical configuration, but rather may be in the form of a half-cylinder or other simple concave shape. As a result, although this half-cylinder or other concave shape will focus UV light, the light will not be focused at an exact point, but rather may be spread over a broader range of focal regions. In order to cope with this non-ideal UV light reflectors, the plastic tube may have any of either a circular or an elliptical cross-section.

In some configurations, in order to better cope with less than ideal optics, the plastic tube may have an elliptical cross section. Here, for example, this elliptical cross section may have an eccentricity greater than 0.5. In some optical arrangements, this configuration may allow for a greater increase in UV absorption (relative to a tube with a circular cross section with a similar cross sectional area).

Additional Discussion:

Catalyst/functional coating: As previously discussed, the invention's catalyst/functional coating can, in some embodiments, be optimized to destroy a broader range of pathogenic organisms, such as by expanding the subgroups of coliform bacteria that can be targeted and neutralized. In particular, while solar UV light disinfection alone (e.g. without a catalyst) be used to target and neutralize some subgroups of coliform bacteria, such as *Escherichia* bacteria (aka *E. coli*), other types of bacterial may be more UV resistant. By contrast, the invention's UV activated catalyst can be used to generate reactive chemicals which are active against a broader range of microbes. As previously discussed, this can include other subgroups of coliform bacteria such as *Shigella, Yersinia, Citrobacter, Enterobacter, Hafnia*, and *Klebsiella*, as well as other pathogenic microbes.

As previously discussed, the catalyst/functional coating can be formed from four basic components: (i) a copper foam structure that can act both as a substrate/holder for the other catalytic components, as well as itself helping to promote the UV catalytic reaction. (ii) an aqueous silver nitrate solution, such as 0.01 to 0.05M $AgNO_3$ solution, used to help create matrix of fine silver strands throughout the copper foam structure (iii) sand or other transparent or semi-transparent UV conducting particles (iv) Portland cement. Other catalytic components, such as titanium dioxide particles or other semiconductor particles may also be added in some embodiments.

Mechanism of action: The invention's catalyst may operate by more than one catalytic mechanism. In some embodiments, one catalytic mechanism may be activated when the solar UV (ultraviolet radiation) strikes the copper promoter (e.g. the copper part of the copper foam material). When this happens, the electrons (e) from the valence band (highest range of electron energies) are energized into the conduction band (lowest range of electron energies) which leaves positive holes ($h^+$) in the valence band. Some of the electrons and holes may recombine, but most will combine with oxygen and/or water to produce reactive oxygen species such as superoxides ($O_2^-$), hydroxyl radicals (.OH) and hydrogen peroxide ($H_2O_2$), all of which can destroy microbes (in particular pathogenic microbes). These reactive species typically act by damaging microbe's cellular structure, also act to prevent further microbial reproduction by disrupting the microbe's DNA.

In some embodiments, the fine silver threads or particles may act as an electron scavenger to prevent the recombination of electrons and holes. In addition, silver particles themselves can also disrupt the cell membranes of the pathogens directly.

The sand combines with the cement to help open pores in the cement structure, as well as to help optically convey incident UV light deeper into the catalyst. The surface area properties of the Portland cement act to further improve the photocatalytic properties of the copper promoter.

Tube/receiver pipe: As previously discussed, in some embodiments, the tube may have an elliptical or other non-circular shape so that it further focuses the intensity of the solar ultraviolet radiation, as received from the reflectors, onto a plurality of different focal points inside the tube. This plurality of points may be configured to provide higher UV illumination to regions where the copper foam catalyst is located. As the pre-purified water flows through the non-circular tube, the amplified intensity of the solar ultraviolet radiation can be used to improve both the effectiveness and speed of reducing pathogenic microbes.

Although in some embodiments, the tube can be made of UV transmitting glass or quartz, rather than plastic, such glass or quartz tubes tend to be more fragile and prone to breakage, and thus may be less useful for emergency kits intended to be used by unskilled workers. However use of glass or quartz tubes is not disclaimed.

The invention claimed is:

1. A method for purifying water, said method comprising:

obtaining a water permeable copper foam support comprising a plurality of open pores with average pore dimensions of between 5 and 0.5 millimeters, said copper foam support having 90% or greater of its volume consisting of void spaces;

treating said copper foam support with an aqueous mixture of silver nitrate for sufficient time as to allow formation of precipitated silver particles in at least some of said pores, thus producing pores comprising silver particles;

treating said copper foam support by spraying a surface of said copper foam support with droplets comprising an aqueous slurry of Portland cement and sand particles so as to fill at least some of said pores with Portland cement and sand particles, thus producing a water permeable copper foam catalyst comprising pores filled with Portland cement, sand particles, and silver particles;

cleaning said copper foam catalyst with water to remove unbound Portland cement, sand particles, and residual soluble material, and then disposing said copper foam catalyst inside of an interior of a hollow, UV transmissive, plastic tube, said plastic tube having a length of at least 1 meter and a diameter of at least 1 centimeter, an entrance opening, and an exit opening so that said copper foam catalyst extends from the entrance opening of said plastic tube to the exit opening of said plastic tube; thus creating a catalytic tube assembly;

said copper foam catalyst configured so that water is not blocked from flowing from said entrance opening of said plastic tube to said exit opening of said plastic tube, but must contact said copper foam catalyst while progressing from said entrance opening to said exit opening;

placing said catalytic tube assembly in at least one focal point of a solar UV reflector, said solar UV reflector configured to concentrate UV components of sunlight so that substantially an entire length of said catalytic tube assembly is exposed to solar UV light when said solar UV reflector receives solar UV illumination;

connecting said entrance opening to a drinking water source comprising drinking water suspected of having microbial contaminants, and said exit opening to a drinking water collection device;

and running said drinking water suspected of having pathogenic microbial contaminants through said catalytic tube assembly in a presence of said solar UV illumination at a rate slow enough that action of said solar UV illumination on said copper foam catalyst is adequate to destroy substantially all of said pathogenic microbial contaminants, thereby producing purified drinking water.

2. The method of claim 1, wherein treating said copper foam support with an aqueous mixture of silver nitrate for sufficient time as to allow formation of precipitated silver particles in at least some of said pores, thus producing pores comprising silver particles, further comprises:

placing said aqueous mixture of silver nitrate and said copper foam support into a common container where said aqueous mixture of silver nitrate is in contact with said copper foam support; and allowing said mixture to react for at least one hour.

3. The method of claim 1, wherein treating said copper foam support by spraying a surface of said copper foam support with droplets comprising an aqueous slurry of Portland cement and sand particles so as to fill at least some of said pores with Portland cement and sand particles, thus producing a water permeable copper foam catalyst comprising pores filled with Portland cement, sand particles, and silver particles further comprises;

applying said aqueous slurry to said copper foam support using a spraying process so as to cover between 20% to 80% of an outer surface of said copper foam support with droplets of said aqueous slurry, while leaving between 80% to 20% of said outer surface of said copper foam support free from said droplets of said aqueous slurry;

and allowing said droplets of said aqueous slurry to react with said copper foam support for at least one hour.

4. The method of claim 3, further placing a perforated mask between said copper foam support and a sprayer used in said spraying process, said perforations configured to ensure that at least 20% of said outer surface of said copper foam support are free from said droplets of said aqueous slurry.

5. The method of claim 1, wherein said copper foam catalyst is in the form of a sheet with a thickness less than 5 millimeters, and wherein said copper foam catalyst is further disposed in a helical twisted sheet configuration over a length of said plastic tube;

said helical twisted sheet configuration disposed so that all of the surfaces of said helical twisted sheet configuration can receive said solar UV light.

6. The method of claim 1, wherein said copper foam catalyst is in the form of a sheet with a thickness of less than 5 millimeters, and wherein said copper foam catalyst is attached to a portion comprising less than 180 degrees of an interior wall of said tube so that more than half of said tube remains translucent to UV light, thus allowing UV light to penetrate into said tube and contact a portion of said copper foam catalyst that is in contact with said drinking water as said drinking water runs through said tube.

7. The method of claim 1, wherein said catalytic tube assembly and said solar UV reflector comprise materials capable of being reversibly configured between a compact storage version with a minimum compressed dimension, and an extended deployment version with a maximum extended dimension;

configuring said catalytic tube assembly and said solar UV reflector to a minimum compressed dimension that is less than one half of said maximum extended dimension, thereby producing a compressed disinfection unit;

transporting said compressed disinfection unit from a first geographic location to a second geographic location;

extending said catalytic tube assembly and said solar UV reflector to said maximum extended dimension, thereby producing an extended disinfection unit;

and using said extended disinfection unit to produce said purified drinking water.

8. The method of claim 7, wherein said catalytic tube assembly and said solar UV reflector, when in said compact storage version, comprise a kit wherein the solar UV reflector is folded to form an enclosure to encase said catalytic tube assembly during transport.

9. The method of claim 7, wherein said copper foam catalyst further comprises joint regions, and wherein during said reversible configuration between said compact storage version and said extended deployment version, said copper foam catalyst compresses and extends using said joint regions.

10. The method of claim 1, wherein said plastic tube has any of a circular and an elliptical cross-section.

11. The method of claim 10, wherein said plastic tube has an elliptical cross section with an eccentricity greater than 0.5 configured to allow for a greater increase in UV absorption relative to a tube with a circular cross section with a similar area.

12. The method of claim 1, wherein said pathogenic microbial contaminants comprise coliform bacteria pathogenic microbes comprising any of *Shigella*, *Yersinia*, *Ciobacter*, *Enterobacter*, *Hafnia* and *Klebsiella* bacteria.

* * * * *